US006223022B1

(12) United States Patent
Birth et al.

(10) Patent No.: US 6,223,022 B1
(45) Date of Patent: Apr. 24, 2001

(54) MOBILE RADIO TELEPHONE WITH IMPEDANCE MATCHING NETWORK HAVING TWO TRANSFORMATION FACTORS

(75) Inventors: Winfrid Birth, Veitsbronn; Ralf Burdenski, Nürnberg; Christian Wünsch, Röthenbach/Pegnitz, all of (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/217,434

(22) Filed: Dec. 21, 1998

(30) Foreign Application Priority Data

Dec. 20, 1997 (DE) .............................................. 197 57 142

(51) Int. Cl.[7] ........................................................ H04B 1/46

(52) U.S. Cl. ................................ 455/80; 455/82; 455/83; 333/17.3; 333/35

(58) Field of Search ................................. 455/78, 80, 82, 455/83, 84; 333/32, 33, 35, 17.3

(56) References Cited

U.S. PATENT DOCUMENTS 5,654,679 * 8/1997 Mavretic ............................. 333/17.3
5,678,199 * 10/1997 Birth et al. ............................. 455/80

FOREIGN PATENT DOCUMENTS

4222190A1 1/1994 (DE) ................................ H04B/1/44

* cited by examiner

*Primary Examiner*—Nguyen T. Vo
*Assistant Examiner*—James K. Moore
(74) *Attorney, Agent, or Firm*—Dicran Halajian

(57) ABSTRACT

A mobile radio telephone includes a transmitter output stage and an antenna. An impedance matching network is inserted between the transmitter output stage and the antenna. The matching network has a transformation factor (T) for adjusting the transmitter load impedance ($Z_{PA}$) to match with the antenna input impedance ($ZA_{Ant}$). The impedance matching network includes at least two impedance transformers that form at least two transformation factors by alternatively connecting in parallel the two impedance transformers.

8 Claims, 2 Drawing Sheets

MOBILE RADIO TELEPHONE WITH IMPEDANCE MATCHING NETWORK HAVING TWO TRANSFORMATION FACTORS

GOVERNMENT LICENSE RIGHTS

The U.S. Government has a paid-up license in this invention and the right in limited circumstances to require the patent owner to license others on reasonable terms as provided for by the terms of Grant No. F29601-99-C-0019 awarded by the United States Air Force.

FIELD OF THE INVENTION

The invention relates to a mobile radio telephone comprising at least a transmitter output stage, at least an antenna and at least an impedance matching network inserted between transmitter output stage and antenna, which matching network has a transformation factor for adjusting a transmitter load impedance to match with an antenna input impedance.

The invention further relates to a transmitter including at least a transmitter output stage, at least an antenna and at least an impedance matching network inserted between transmitter output stage and antenna which matching network has a transformation factor for adjusting a transmitter load impedance to match with an antenna input impedance.

BACKGROUND OF THE INVENTION

From disclosure DE 42 22 190 A1 is known such a radio telephone comprising an antenna switch for alternately operating in the transmitting and receiving states. For adjustment purposes is then arranged a $\lambda/4$ waveguide between transmitter output stage (31) and antenna (1). As a result, the special transformation properties for the initial and terminal resistance $Z_A$ and $Z_E$ respectively, of the $\lambda/4$ waveguide can be used. The terminal resistance $Z_E$ of a $\lambda/4$ waveguide is transformed on the input of the $\lambda/4$ waveguide in dependence on its wave resistance Z. By means of the parameters of the waveguide range such as geometric dimensions and material constants ($\epsilon,\mu$), the wave resistance Z can be set for the wavelength $\lambda$ to be used. The transformation of the resistance is generally effected in accordance with the relation $Z_A=Z^2/Z_E$. In the transmitting state, the $\lambda/4$ waveguide (32) connected to the transmitter output stage (31) transforms the antenna impedance in accordance with the requirements of the transmitter output stage (31). In this manner, the transmitter output stage (31) in the transmitting state is adjusted to match with the antenna (1) and the output power of the transmitter output stage (31) is fully passed on to the antenna (1). As a result of, inter alia, possibilities to change the wave resistance Z, a suitable transformation factor may be set. The second $\lambda/4$ waveguide (32) may be discarded for the transformation of the resistance when the wave resistance of the waveguide is set equal to the antenna resistance (see above, transformation equation).

The load impedance of a power amplifier in a transmitter output stage is adjusted to match with the input of an antenna to achieve a maximum efficiency of the transmitter output stage (ratio of the power fed to the antenna to the overall power used). An adjustment by means of a state-of-the-art $\lambda/4$ waveguide, however, provides a good efficiency (fixed transformation factor) only for an operating state with a certain output power $P_A$ and supply power $U_B$ of the power amplifier. In mobile radio telephones, for example, for mobile radio in accordance with the GSM standard, however, various levels are determined for the output power, which are to be exactly set by means of a power control in dependence on the transmission properties. Furthermore, the supply voltage $U_B$ varies in accordance with a discharge curve for the battery used. Consequently, as against the adjusted operating state, for example, with an increased supply voltage $U_B$ and regulated output power $P_A$, the efficiency drops because the voltage $U_A$ on the output of the transmitter output stage remains constant. This also provides that the current $I_A$ on the output retains the regulated constant value, so that the efficiency diminishes strongly. All in all, often only a reduced efficiency of the transmitter output stage is achieved. This is a considerable disadvantage, especially for battery-operated mobile radio telephones because of the consequent shortened service life.

SUMMARY OF THE INVENTION

Therefore, it is an object of the invention to provide a mobile radio telephone that has improved the efficiency of the transmitter output stage in different operating states.

The object is achieved in that at least two impedance transformers in the impedance matching network form at least two transformation factors by alternatively connecting them in parallel. In this manner, at least two different load impedances may be set for the transmitter output stage, whereas even more transformation factors are conceivable by suitable circuit formations. The arrangement in the impedance matching network may be adapted in a highly flexible manner to requirements especially by means of software-controlled switches, without the necessity to make changes in the hardware. This provides that a proper efficiency of the transmitter output stage can be achieved in different operating states, because the transmitter output stage has a load impedance from which the voltage amplitude develops that is the highest possible for the set transmitter power.

A preferred embodiment of the invention is that at least two $\lambda/4$ waveguides form the impedance transformers. The $\lambda/4$ waveguides may be arranged as coaxial conductors or as microstrips. Also a copy of a $\lambda/4$ waveguide by means of an LC network that has the respective transmission properties may be used.

In an advantageous further embodiment, a first $\lambda/4$ waveguide in the impedance matching network is coupled, on the one hand, to the output of the transmitter output stage and, on the other hand, to the input of the antenna and a second $\lambda/4$ waveguide is coupled, on the one hand, to the output of the transmitter output stage and, on the other hand, to at least one switch which establishes in a first position the connection to a ground terminal and in a second position to the input of the antenna. The switch may be formed by a PIN-diode high-frequency switch or a bistable mechanical relay. With such an arrangement, the control of the switches may be taken over by software, so that a fast and flexible control of the impedance matching network is possible. Furthermore, by arranging the switch on the side of the antenna, it is avoided that large losses arise in the switch. Since this side is high-ohmic, there is only a small current flowing in the transmitter output stage compared to the maximum transmitting current.

Besides, the object of the invention is further achieved by a transmitter in which at least two impedance transformers in the impedance matching network form at least two transformation factors by alternatively connecting them in parallel.

These and other aspects of the invention will be apparent from and elucidated with reference to the embodiments described hereinafter.

DETAILED DESCRIPTION OF THE INVENTION

Figure 1:
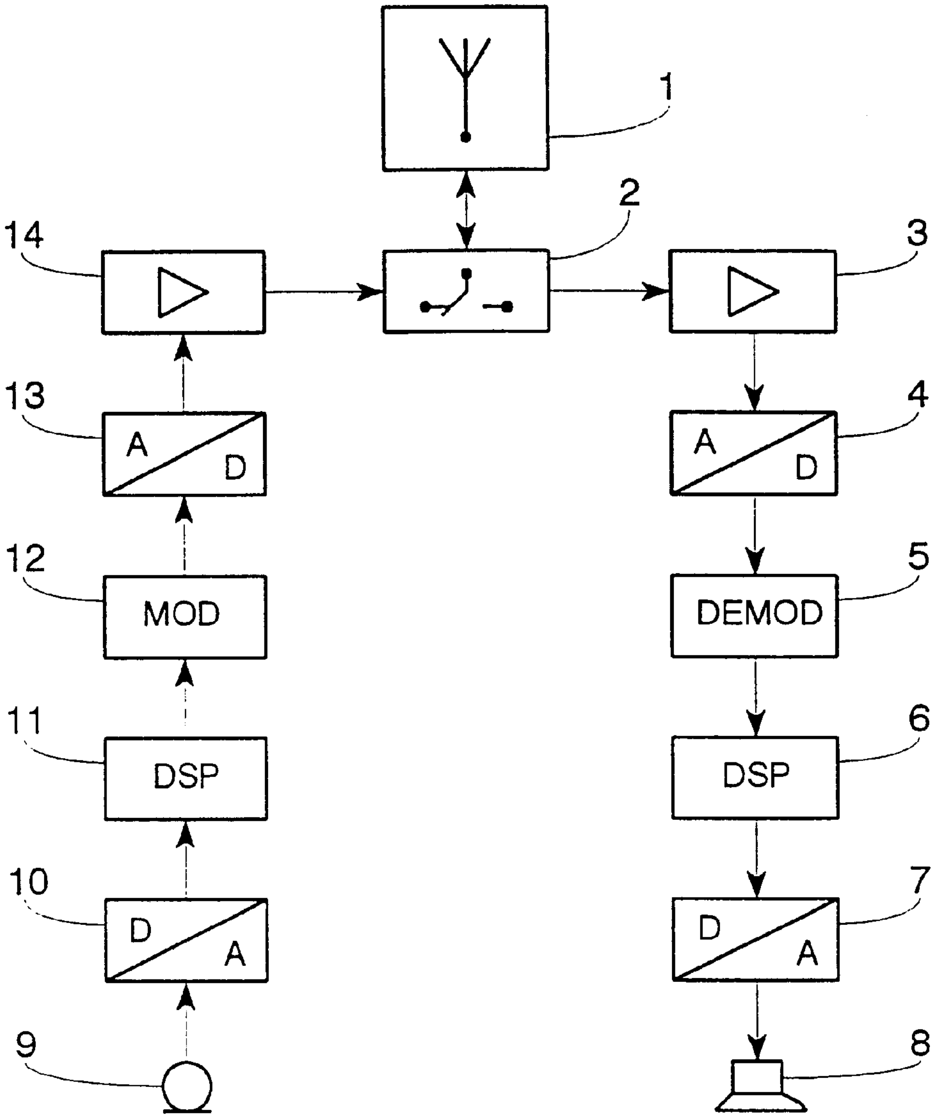
FIG. 1 shows a block diagram of the functional blocks of the mobile radio telephone, FIG. 2 gives a diagrammatic representation of a part of the transmitting branch of the mobile radio telephone, and FIG. 3 gives a detailed representation of an impedance matching network between a transmitter output stage and an antenna.

FIG. 1 shows in a block diagram the functional blocks of a transmitting and a receiving branch of a mobile radio telephone such as corresponds, for example, to a mobile telephone according to the GSM standard. An antenna 1 is coupled to an antenna duplexer 2 which connects the receiving branch and transmitting branch respectively, to the antenna 1 in a receiving and transmitting state. In the receiving state, the analog radio signals reach an A/D converter 4 via a receiving circuit 3. The generated digital signals are demodulated in a demodulator 5 and subsequently applied to a digital signal processor (DSP) 6. In the DSP 6 are performed in succession the functions of equalization, decryption, channel decoding and speech decoding which are not shown separately. Analog signals are generated by a D/A converter 7, which signals are delivered through a loudspeaker 8.

In the transmitting state, the analog speech signals captured by a microphone 9 are converted by an AID converter 10 and then applied to a DSP 11. The DSP 11 carries out the functions of speech coding, channel coding and encryption which are complementary to the receiving state, so that all the functions are carried out by a single DSP. The binary coded data words are GMSK modulated in a modulator 12 and then converted into analog radio signals in a D/A converter 13. A transmitter output stage 14 including a power amplifier generates the radio signal to be transmitted by the antenna 1.

Figure 2:
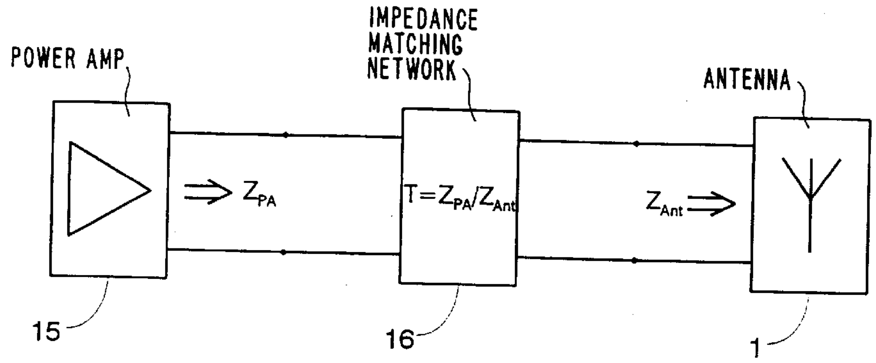

In the further description with reference to FIG. 2, only the power amplifier 15 of the transmitter output stage 14 is considered. The power amplifier 15 is connected to the antenna 1 via an impedance matching network 16 which has a transformation factor T. The antenna 1 has an input resistance $Z_{Ant}$ which has a value of, for example, 75Ω. For obtaining optimum efficiency of the transmitter output stage 14, the input resistance $Z_{Ant}$ is to be adjusted to match with a required load $Z_{PA}$ of the power amplifier 15. For large transmitter powers (around 2 W) a load $Z_{PA}$ of about 1–2Ω for the power amplifier 15 is to be set, whereas a more high-ohmic load is necessary for a required transmitting power that is smaller. As a result, the impedance matching network 16 transforms the input resistance $Z_{Ant}$ of the antenna 1 by the transformation factor $T.Z_{Ant}=Z_{PA}$ to the output of the power amplifier 15.

The power amplifier 15 is supplied with power by a battery (not shown) which has an operating voltage $U_B$. On the output the power amplifier produces an output voltage $U_A$ which is applied to the respective load $Z_{PA}$. In a mobile radio telephone according to the GSM standard, a great many adjustable levels are determined for the transmitting power. The output power $P_{PA}$ of the power amplifier 15 which power works on the real portion of the load $Z_{PA}$, that is, is radiated as a transmitting power, is therefore always regulated to an exact value. According to $P_{PA}=½.U_A^2/Z_{PA}$ and with a constant load $Z_{PA}$, the output voltage $U_A$ also remains constant. As a result, according to $Z_{PA}=U_A/I_A$, also the output current $I_A$ remains constant, so that an excessive power consumption is frequently found. The load $Z_{PA}$, that is, also the associated transformation factor T, is selected for a specific operating point of the output voltage $U_A$. According to $\eta=P_{PA}/P_{Gesamt}$ and an operating voltage of $U_B$ there is an efficiency η (typically η>40%) for the power amplifier 15. This efficiency degrades once the operating voltage $U_B$ is increased compared with the set operating point, that is, in accordance with the typical discharge curve of the battery used. For optimizing the efficiency for various operating points of the operating voltage $U_B$, the transformation factor T and thus the load $Z_{PA}$ of the power amplifier 15 can be switched between two values. This will be described with reference to FIG. 3.

Figure 3:
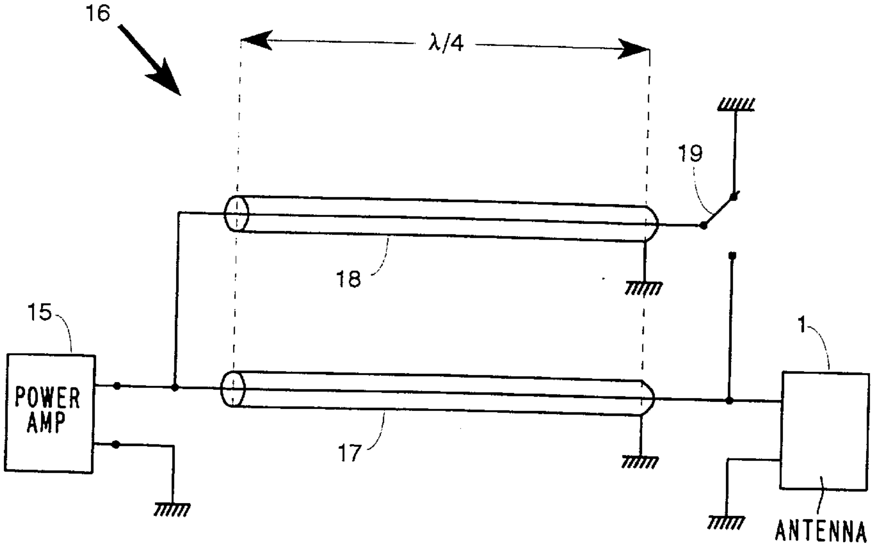

The impedance matching network 16 is shown in more detail in FIG. 3. A first impedance transformer 17 arranged as a λ/4 waveguide is connected, on the one hand, to the output of the power amplifier 15 and, on the other hand, to the input of the antenna 1. This λ/4 waveguide 17 is designed such that it has the impedance $Z_W=\sqrt{(Z_{Ant}.Z_{PA})}$ with the transmitting frequency used, to adjust the connected load $Z_{Ant}$ to match with the required load impedance $Z_{PA}$ of the power amplifier 15. The value results from the equation for a λ/4 transformer according to which for the input impedance $Z_{EIN}$ of a λ/4 waveguide in dependence on the line impedance $Z_W$ and the impedance on the output $Z_{AUS}$ there holds: $Z_{EIN}=Z_W^2/Z_{AUS}$. By suitably selecting the parameters for the λ/4 waveguide 17, a respective impedance $Z_W$ and thus a transformation factor $T=Z_{PA}/Z_{Ant}=(Z_W/Z_{Ant})^2$ may be set. The λ/4 waveguide 17 may then be arranged as a stripline, coaxial cable or be formed by an LC network which copies such a λ/4 waveguide. The impedance may be set by means of the geometric dimensions and material constants. The waveguide may also be copied by copying the line with discrete building blocks. The copy of the line may then contain both inductive (L) and capacitive (C) elements which correspond to the respective propagation constant per unit length (L'=L/mm or C'=C/mm) of the waveguide to be copied. In all possible realizations, the effective length of the waveguide can be adjusted to match with the transmitting frequency used.

A second impedance transformer 18 is also realized by a λ/4 waveguide, which is connected in parallel to the first λ/4 waveguide 17 in the power amplifier 15. At the other end, the second λ/4 waveguide 18 is connected to a switch 19 which connects in a first switch position to a ground terminal and in a second switch position to the antenna 1. The short-circuit at the end in the first switch position is transformed into an open-circuit situation at the beginning by the λ/4 waveguide 18. This causes the second λ/4 waveguide 18 to be inactive in this switch position. On the other hand, because of the parallel arranged λ/4 waveguides 17 and 18 in the second switch position, a new λ/4 waveguide arises. The impedance of the new λ/4 waveguide is the result of the parallel combination of the impedances of the λ/4 waveguides 17 and 18 with $Z_W=(Z_{18}.Z_{17})/(Z_{17}+Z_{18})$. This also causes the transformation factor T of the impedance matching network 16 to change.

In this manner, two different transformation factors can be realized surprisingly simply and so can an adjustment of the power amplifier 15 to match with the antenna 1 at two different operating points. The fact that the switch 19 is switched to the antenna provides a switching to a high-ohmic position. The small load impedance $Z_{PA}$ of the power amplifier 15 of about 1–2Ω is transformed up, so that the switch 19 is loaded with a small current. Therefore, a dimensioning of the switch to the maximum transmitting current is not required, and only slight losses occur in the switch 19. Bistable mechanical relays or conventional high-frequency switches including PIN diodes can be used for the switch 19. Mostly the adjustment of the transmitter output stage 14 to match with the antenna 1 can be effected in two transformation stages, the first stage being included in the transmitter output stage 14. As a result, the impedance matching network 16 according to the invention need not convert $Z_{PA}$=1Ω into $Z_{Ant}$=75Ω.

For example, two waveguides are used as λ/4 waveguides 17 and 18. The wide waveguide 17 has a wave resistance of $Z_{17}$=53Ω and the narrow waveguide 18 of $Z_{18}$=128Ω. With an antenna input impedance of $Z_{Ant}$=75Ω there is a transformation to a value of 37.5Ω in the first switch position. This transformation is completed by a further stage which is included in the transmitter output stage 14 and realizes a transformation factor of $n^2$=17. This additional transformation is developed by integrated transformers as well as by available parasitic inductivities and capacitances. This provides a load of $Z_{PA}$=2.2Ω for the first switch position. In the case of second λ/4 waveguides 18 arranged in parallel, the active impedance of the new λ/4 waveguide is $Z_W$=($Z_{18}$.$Z_{17}$)/($Z_{17}$+$Z_{18}$)=37.5Ω, so that the impedance matching network 16 transforms by the factor T=0.25 into 18.8Ω. By means of the additional transformation in the transmitter output stage 14, there is a load of $Z_{PA}$=1.1Ω. By turning the switch 19, the load changes, so that the output current $I_A$ of the power amplifier 15 is reduced with a constant output voltage $U_A$. This reduces the power consumption of the transmitter output stage 14, for example, with increased operating voltage $U_B$ of a battery despite constantly controlled output power. A drop of the efficiency from the η>40% to a value around 30% as a result of the mismatch may thus be avoided. Furthermore, when the load is switched over to, only the ohmic load is changed, whereas the resonance frequency of oscillator circuits set to the transmitting frequency is not off-tuned.

What is claimed is:

1. A mobile radio telephone comprising at least a transmitter output stage, at least an antenna and at least an impedance matching network inserted between the transmitter output stage and the antenna, wherein said matching network has a transformation factor for adjusting a transmitter load impedance to match with an antenna input impedance, said matching network including at least two impedance transformers that form at least two transformation factors, herein one of said at least two transformation factors is provided by a parallel connection between inner conductors of said at least two impedance transformers without a connection between said inner conductors and ground.

2. A mobile radio telephone as claimed in claim 1, wherein at least two λ/4 waveguides form said at least two impedance transformers.

3. A mobile radio telephone as claimed in claim 1, wherein another of said at least two transformation factors is provided by disconnecting said parallel connection and connecting one of said at least two impedance transformers to ground.

4. A mobile radio telephone comprising at least a transmitter output stage, at least an antenna, and at least an impedance matching network inserted between the transmitter output stage and the antenna, wherein said matching network has a transformation factor for adjusting a transmitter load impedance to match with an antenna input impedance, said matching network including at least two impedance transformers that form at least two transformation factors by alternatively connecting in parallel said at least two impedance transformers, wherein the impedance matching network comprises a first λ/4 waveguide coupled between the transmitter output stage and an input of the antenna, and a second λ/4 waveguide coupled between the transmitter output stage and an at least one switch which establishes in a first switch position a connection to a ground terminal and in a second switch position another connection to the input of the antenna.

5. A mobile radio telephone as claimed in claim 4, wherein said at least one switch is realized by PIN diodes.

6. A mobile radio telephone as claimed in claim 4, wherein a bistable mechanical relay forms said at least one switch.

7. A transmitter comprising at least a transmitter output stage, at least an antenna and at least an impedance matching network arranged between the transmitter output stage and the antenna, the impedance matching network having a transformation factor for adjusting a transmitter load impedance to match with an antenna input impedance, wherein said matching network includes at least two impedance transformers that form at least two transformation factors, wherein one of said at least two transformation factors is provided by a parallel connection between inner conductors of said at least two impedance transformers without a connection between said inner conductors and ground.

8. A transmitter as claimed in claim 7, wherein another of said at least two transformation factors is provided by disconnecting said parallel connection and connecting one of said at least two impedance transformers to ground.

* * * * *